United States Patent
Ho et al.

(10) Patent No.: US 8,717,145 B2
(45) Date of Patent: May 6, 2014

(54) RFID PORTAL SYSTEM WITH RFID TAGS HAVING VARIOUS READ RANGES

(75) Inventors: Wing Kei Ho, Boynton Beach, FL (US); Mark Alexis, Wellington, FL (US)

(73) Assignee: Tyco Fire & Security Services GmbH, Neuhausen am Rheinfall (CH)

( * ) Notice: Subject to any disclaimer, the term of this patent is extended or adjusted under 35 U.S.C. 154(b) by 525 days.

(21) Appl. No.: 12/546,758

(22) Filed: Aug. 25, 2009

(65) Prior Publication Data

US 2011/0050400 A1 Mar. 3, 2011

(51) Int. Cl.
*H04Q 5/22* (2006.01)
*H04Q 1/00* (2006.01)
*G06K 7/01* (2006.01)

(52) U.S. Cl.
USPC .......................... 340/10.1; 340/10.5; 340/3.1

(58) Field of Classification Search
CPC ............ H04Q 1/00; H04Q 5/22; G01S 13/75; G06K 7/01
USPC .............. 342/10.1–10.5, 572.1, 42, 125, 450, 342/457, 44, 51, 3.51, 3.52; 455/404.2, 455/414.2
See application file for complete search history.

(56) References Cited

U.S. PATENT DOCUMENTS

| | | | | |
|---|---|---|---|---|
| 5,410,315 A | * | 4/1995 | Huber | 340/10.32 |
| 5,500,651 A | * | 3/1996 | Schuermann | 342/42 |
| 5,550,547 A | * | 8/1996 | Chan et al. | 342/42 |
| 5,673,037 A | * | 9/1997 | Cesar et al. | 340/10.32 |
| 5,777,561 A | | 7/1998 | Chieu et al. | |
| 6,172,596 B1 | | 1/2001 | Cesar et al. | |
| 6,486,769 B1 | * | 11/2002 | McLean | 340/10.32 |
| 6,496,806 B1 | * | 12/2002 | Horwitz et al. | 705/28 |
| 7,158,046 B2 | * | 1/2007 | Cesar et al. | 370/313 |
| 7,239,229 B2 | * | 7/2007 | Bauhahn | 340/10.42 |
| 7,280,045 B2 | * | 10/2007 | Saarisalo et al. | 340/572.7 |
| 7,327,257 B2 | * | 2/2008 | Posamentier | 340/572.1 |
| 7,425,888 B2 | * | 9/2008 | Powell | 340/10.2 |
| 7,573,370 B2 | * | 8/2009 | Becker et al. | 340/10.41 |
| RE41,815 E | * | 10/2010 | Dando et al. | 340/572.1 |
| 7,843,347 B2 | * | 11/2010 | Nikitin et al. | 340/572.7 |
| 7,880,589 B2 | * | 2/2011 | Steele et al. | 340/10.32 |
| 2005/0083180 A1 | | 4/2005 | Horwitz et al. | |
| 2006/0176152 A1 | * | 8/2006 | Wagner et al. | 340/10.2 |
| 2007/0159305 A1 | | 7/2007 | Cesar et al. | |

OTHER PUBLICATIONS

International Search Report and Written Opinion dated Dec. 8, 2010 for International Application No: PCT/US2010/002274, International Filing Date Aug. 19, 2010 consisting of 10-pages.

* cited by examiner

*Primary Examiner* — Nam V Nguyen
(74) *Attorney, Agent, or Firm* — Alan M. Weisberg; Christopher & Weisberg, P.A.

(57) ABSTRACT

A system and method selectively reads radio frequency identification ("RFID") tags within an RFID interrogation zone. A portion of the RFID tags have a first operating range and a portion of the RFID tags have a second operating range that is different from the first operating range. Each RFID tag is programmed with an identifier associated with the operating range of the RFID tag. A first interrogation signal is transmitted which has sufficient power to activate RFID tags that are located within the RFID interrogation zone and have the first operating range. A response signal is received from each RFID tag capable of receiving the first interrogation signal. Each response signal indicates the identifier of the associated RFID tag. Each RFID tag that has an identifier associated with the first operating range is selected.

11 Claims, 5 Drawing Sheets

RFID PORTAL SYSTEM WITH RFID TAGS HAVING VARIOUS READ RANGES

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to radio frequency identification ("RFID") systems and more specifically to a method and system for discriminating between short range RFID tags and long range RFID tags, and only identifying tags passing through an RFID portal.

BACKGROUND OF THE INVENTION

One of the key applications for RFID is inventory control. When an item is tagged with an RFID tag and moved through the supply chain, the ability to track the RFID tag facilitates the operation of the supply chain. However, RFID readers are not installed to cover the whole supply chain due to the cost and complication with such an approach. Instead, RFID readers are deployed at the check/transition points along the supply chain, e.g., at a loading dock door between the warehouse and truck, at a doorway between backroom and retail floor, etc. RFID readers in these locations are sometimes referred to as portal readers. The RFID tags on the items are supposed to be read only when the item passes through the portal. However, some "long range" RFID tags are generally designed to maximize the gain and efficiency of their antennas. This mixed tag environment results in long range RFID tags that are near the portal but beyond the doorway being unintentionally read, leading to errant tracking of the tagged item. This problem is generally referred to as over-range problem.

To limit the range of the RFID reader to the doorway, a reduction of the reader transmit power is sometimes used. This approach requires that all RFID tags have a similar read range. As other RFID applications have developed, some items now require the use of a small "short range" tag which has a lower read range. The small tag is not able to be read with the reduced transmitted power. Therefore, configuring the transmit power of the RFID reader to accommodate all tags in this mixed tag environment results in either over range or a failed read.

In addition to reducing the level of transmit power as described above, others have attempted to improve the performance of the small tag. Due to the physics behind the electromagnetic radiation and the interaction of antenna configuration of the RFID tag, such attempts inefficiently result in a physically larger tag than is actually required for the application.

RFID readers having more complex antenna systems have been designed to focus the RF field and restrict read range to a limited area or volume. However, the deployment of complex antenna naturally results in higher cost.

Therefore, what is needed is a system and method to discriminate between short range RFID tags and long range RFID tags and only read tags passing through an RFID interrogation zone, e.g., RFID portal.

SUMMARY OF THE INVENTION

The present invention advantageously provides a method and system for selectively reading only radio frequency identification ("RFID") tags located within an RFID interrogation zone. Generally, each RFID tag is programmed with an identifier associated with the operating range of the RFID tag. Depending upon the transmit power level of an RFID reader, only RFID tags programmed with a predetermined identifier are selected for reading.

In accordance with one embodiment of the present invention, a method is provided for selectively reading RFID tags within an RFID interrogation zone. A portion of the RFID tags have a first operating range and a portion of the RFID tags have a second operating range different from the first operating range. Each RFID tag is programmed with an identifier associated with the operating range of the RFID tag. A first interrogation signal is transmitted which has sufficient power to activate RFID tags located within the RFID interrogation zone which have the first operating range. A response signal is received from each RFID tag capable of receiving the first interrogation signal. Each response signal indicates the identifier of the associated RFID tag. Each RFID tag that has an identifier associated with the first operating range is selected.

In accordance with another aspect of the present invention, an RFID reader for selectively reading RFID tags within an RFID interrogation zone includes a transceiver and a processor. A portion of the RFID tags have a first operating range and a portion of the RFID tags have a second operating range different from the first operating range. Each RFID tag is programmed with an identifier associated with the operating range of the RFID tag. The transceiver is operable to transmit a first interrogation signal having sufficient power to activate RFID tags located within the RFID interrogation zone which have the first operating range and receive a response signal from each RFID tag capable of receiving the first interrogation signal. Each response signal indicates the identifier of the associated RFID tag. The processor is electrically connected to the transceiver. The processor is operable to select each RFID tag having an identifier associated with the first operating range.

In accordance with yet another aspect of the present invention, an RFID system includes a plurality of RFID tags and an RFID reader. A portion of the RFID tags have a first operating range and a portion of the RFID tags have a second operating range. The first operating range is smaller than the second operating range. Each RFID tag is programmed with an identifier associated with the operating range of the RFID tag. The RFID reader is operable to transmit a first interrogation signal having sufficient power to activate RFID tags located within an interrogation zone which have the first operating range and receive a response signal from each RFID tag capable of receiving the first interrogation signal. Each response signal indicates the identifier of the associated RFID tag. The RFID reader is further operable to select each RFID tag having an identifier associated with the first operating range and read each selected RFID tag.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
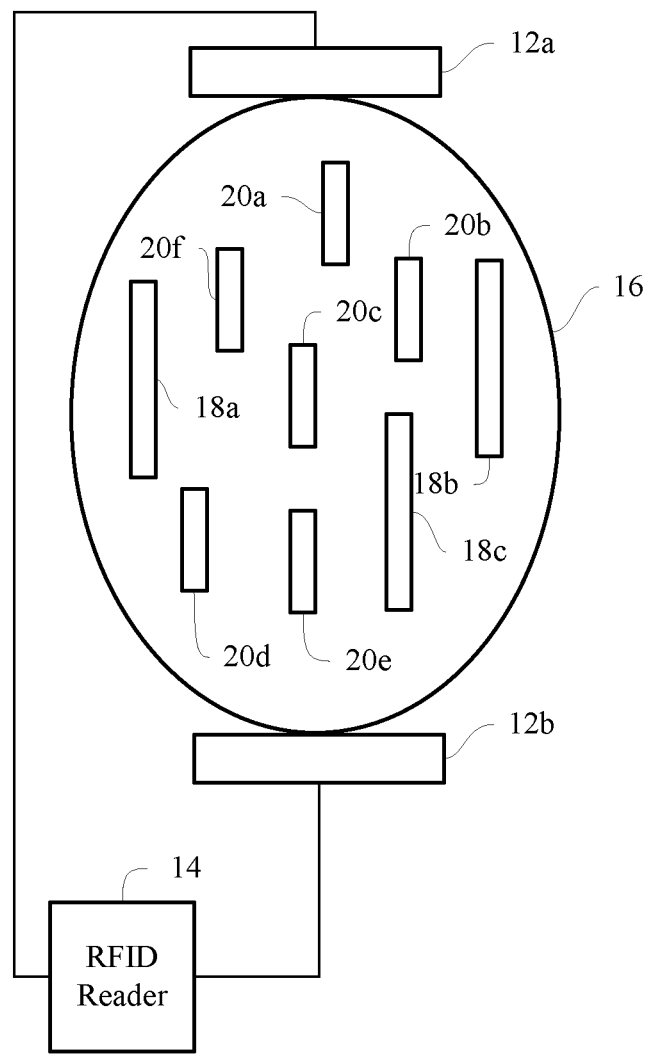
FIG. 1 is a block diagram of an exemplary radio frequency identification ("RFID") system constructed in accordance with the principles of the present invention.

Before describing in detail exemplary embodiments that are in accordance with the present invention, it is noted that the embodiments reside primarily in combinations of apparatus components and processing steps related to implementing a system and method for discriminating between short range radio frequency identification ("RFID") tags and long range RFID tags so that only RFID tags passing through an RFID portal are read. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein, the terms "RFID tags" and "RFID labels" are used interchangeably.

One embodiment of the present invention advantageously provides a method and system for discriminating between short range RFID tags and long range RFID tags. Generally, one embodiment of the present invention provides an RFID reader with the ability to switch to different transmit levels and read the stored information on the read range of the tag to overcome the over range or inadequate read problem due to the different range of tags of different designs. RFID tags are identified as short range or long range tags by setting at least one identification bit in the RFID tag. When the reader is at high transmit level, reads associated with short range tags are all valid, while at low transmit level, both the short range and long range tag reads are valid. Therefore, to validate the read, the reader requires the knowledge about the read range of the tag which could be stored in and read from the memory of the RFID tag.

Referring now to the drawing figures in which like reference designators refer to like elements, there is shown in FIG. 1 one configuration of an exemplary RFID system 10 constructed in accordance with the principles of the present invention and located, for example, at a facility entrance. RFID system 10 includes a pair of pedestals 12a, 12b (collectively referenced as pedestal 12) on opposite sides of an entrance. One or more antennas for the EAS detection system 10 may be included in pedestals 12a, 12b. The antennas located in the pedestals 12 are electrically coupled to an RFID reader 14 which transmits a radio frequency signal forming an interrogation zone 16 between the pedestals 12a, 12b. The RFID reader 14 is capable of distinguishing between long range RFID tags 18a, 18b, 18c (referenced collectively as "long range tag 18") and short range RFID tags 20a, 20b, 20c, 20d, 20e, 20f (referenced collectively as "short range tag 20").

In one embodiment, each RFID tag 18 and 20 includes an RFID chip having a memory (not shown) designated for information associated with the manufacturer of the RFID chip. For example, the TID memory location of the RFID chip may be used to discriminate two tag designs during inventory—one with a small inlay design ("short range") and one with a large inlay design ("long range"). The Transponder ID ("TID") memory location of the RFID chip may be programmed at the point of manufacture with specific 12 bit tag model numbers, e.g., bits 14h to 1Fh are currently allocated for the tag model number. One model number may designate a short range tag, and another model number may designate a long range tag. The standard Electronic Product Code ("EPC") air protocol may be used to conduct and inventory round customized for each tag design, for example, by using the EPC SELECT command.

Figure 2:
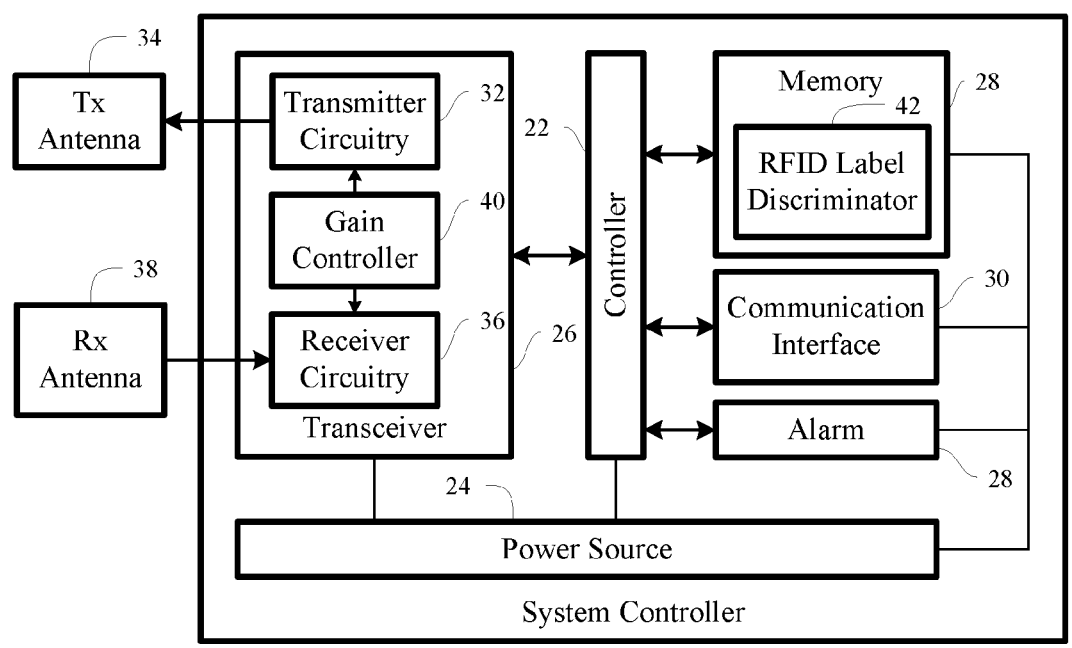
FIG. 2 is a block diagram of an exemplary RFID reader constructed in accordance with the principles of the present invention.

Referring now to FIG. 2, an exemplary RFID reader 14 may include a controller 22 (e.g., a processor or microprocessor), a power source 24, a transceiver 26, a memory 28 (which may include non-volatile memory, volatile memory, or a combination thereof) and a communication interface 30. The controller 22 controls radio communications, storage of data to memory 28, and communication of stored data to other devices. The power source 24, such as a battery or AC power, supplies electricity to the RFID reader 14.

The transceiver 26 may include a transmitter 32 electrically coupled to one or more transmitting antennas 34 and a receiver 36 electrically coupled to one or more receiving antennas 38. Alternately, a single antenna or pair of antennas may be used as both the transmitting antenna 34 and the receiving antenna 38. The transmitter 32 transmits a radio frequency signal using the transmit antenna 34 to "energize" a passive RFID tag within the interrogation zone 16 of the RFID system 10 and/or communicate with an active RFID tag. The receiver 36 detects the response signal of the RFID tag using the receive antenna 38. A gain controller 40 controls the output power level of the transmitter 32 and/or the receiver 36 sensitivity to switch the transceiver 26 between a short range tag detection mode and a long range detection mode.

The memory 28 may include an RFID tag discriminator 42 for determining the type of RFID tag responding within the interrogation zone. Operation of the RFID tag discriminator 42 is described in greater detail below.

Figure 3:
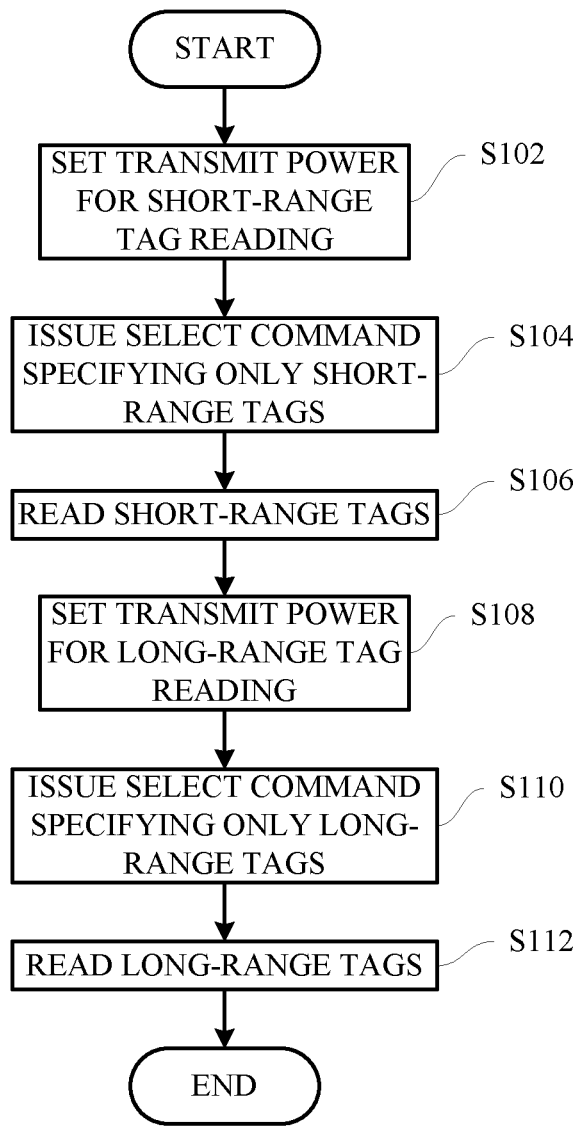
FIG. 3 is a flow chart of an exemplary RFID tag discriminating process according to the principles of the present invention.
Figure 4:
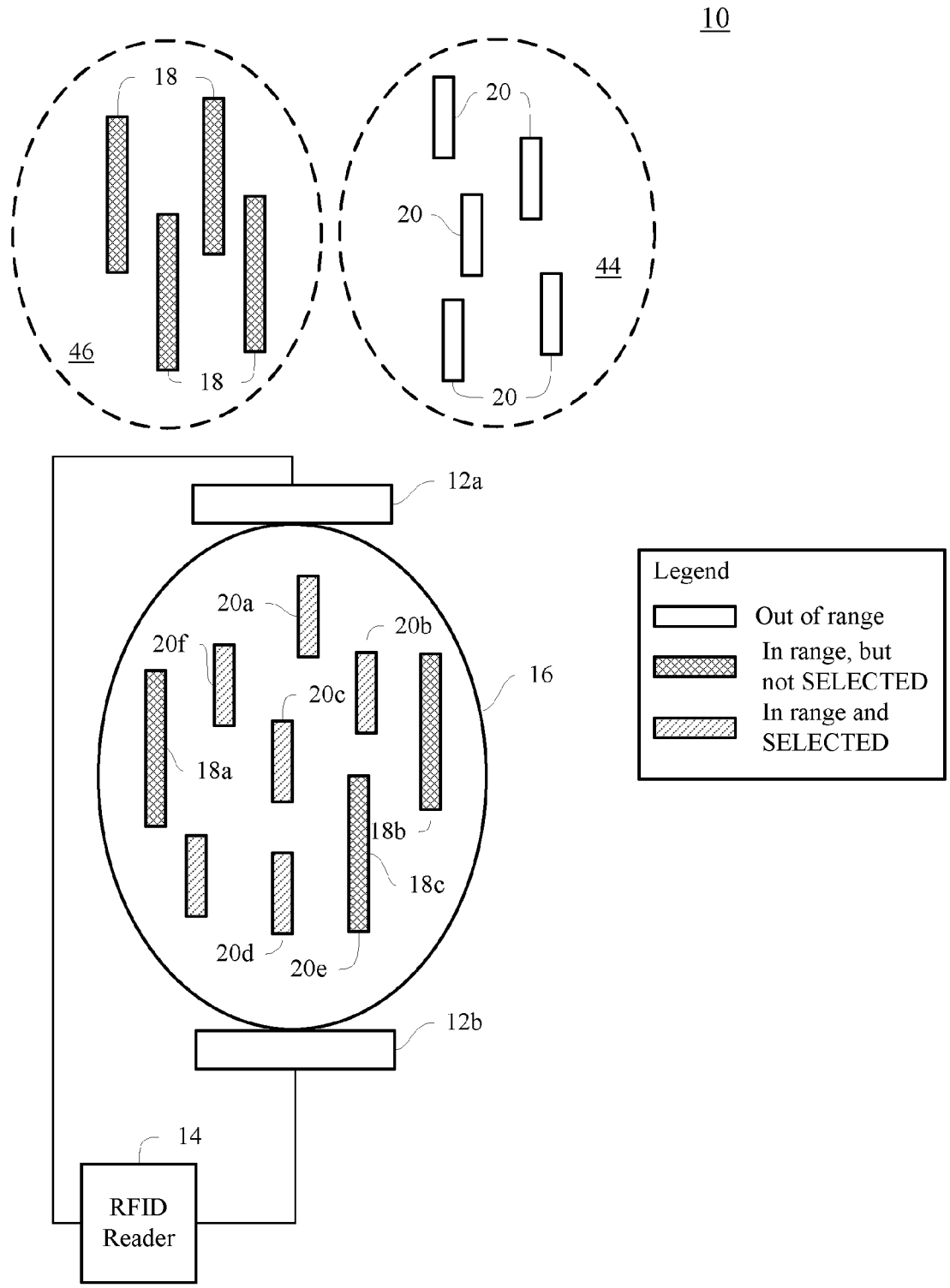
FIG. 4 is a diagram of an exemplary RFID system identifying short range tags according to the principles of the present invention.

Referring now to FIG. 3, a flow chart is provided that describes exemplary steps performed by the RFID reader 14 to identify only RFID tags that are located within the interrogation zone 16. In this embodiment, the RFID system 10 makes use of the RFID tag's EPC TID memory during an inventory, specifically to prevent reading and reporting tag IDs, e.g., EPC numbers, beyond the intended range of the RFID portal. It should be noted that the RFID system 10 may include multiple RFID readers 14 and antennas 12 performing inventory functions for different portal zones. An RFID reader 14 prepares to inventory short range tags 20 ("short range tag inventory") by setting the transmit power to a setting optimized for these short range tags 20 (step S102). FIG. 4 illustrates a scenario for short range tag inventory. The short range tag power setting may be determined in practice by determining the maximum transmit power required to read short range tags 20 within the intended portal range 16 with reasonable reliability. Short range tags 20 beyond the intended portal zone 16, e.g., in zone 44 in FIG. 4, are not read due to insufficient power. The reader 14 issues a SELECT command specifying only the short range tag model number in the tag TID (step S104). Because of this SELECT command, long range tags 18 will not respond to the inventory round that follows. In the absence of the present invention, long range tags 18 that are outside the intended portal range 16, e.g., in zone 46 in FIG. 4, at this reader transmit power level, would normally respond during the inventory. The SELECT command advantageously prevents these long range tags 18 from responding. The RFID reader 14 then reads the short range tags 20 within the intended portal range 16 to complete the short range tag inventory (step S106).

Figure 5:
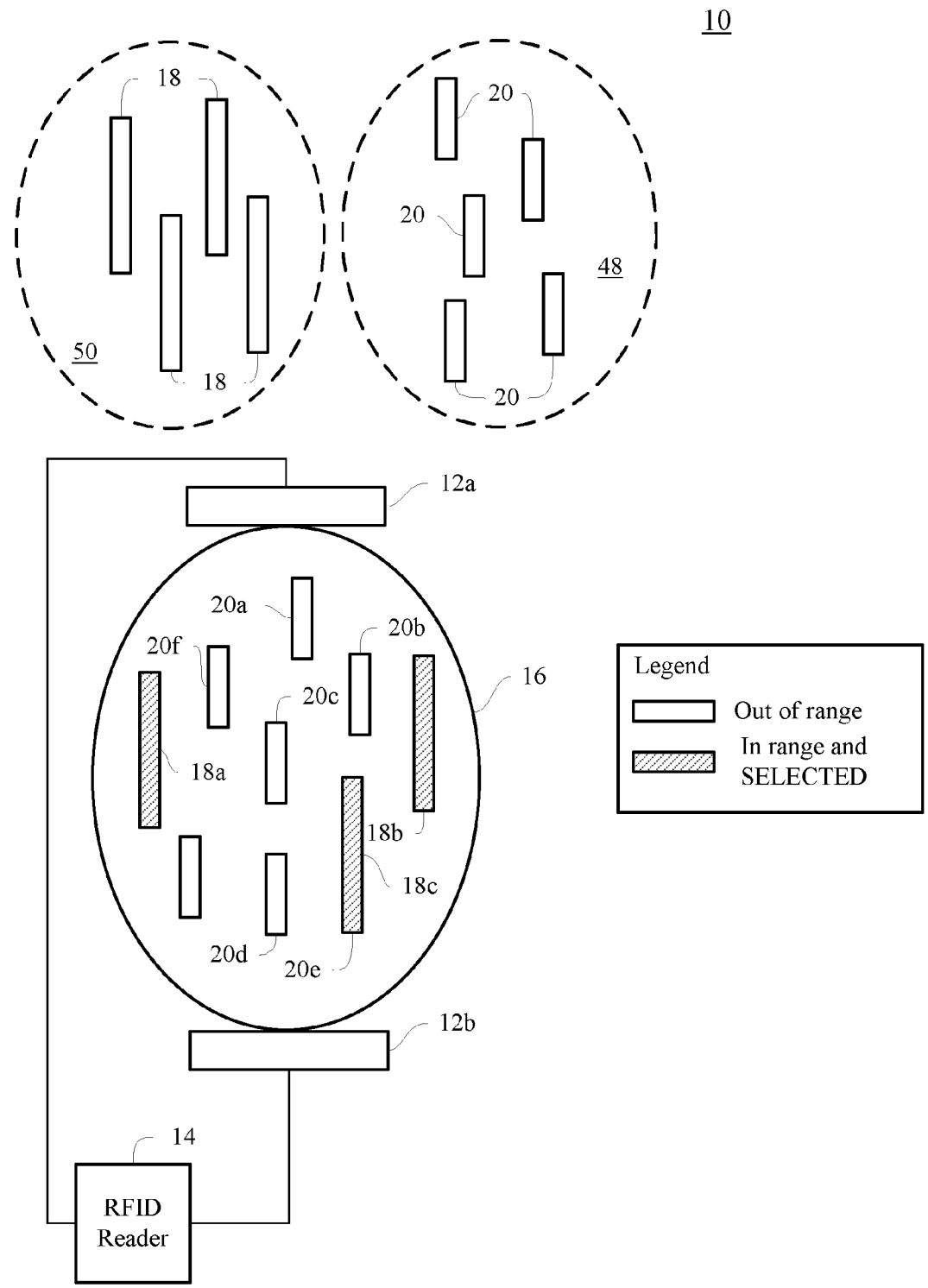
FIG. 5 is a diagram of an exemplary RFID system identifying long range tags according to the principles of the present invention.

Once the "short range tag inventory" is completed, the RFID reader 14 prepares to inventory long range tags 18 ("long range tag inventory") by setting the transmit power to a setting optimized for these long range tags 18 (step S108). FIG. 5 illustrates a scenario for long range tag inventory. The long range power setting may be determined in practice by determining the maximum transmit power required to read long range tags 18 within the intended portal range 16 with reasonable reliability. The long range power tends to be a lower transmit power than the setting used in the "short range tag inventory." Thus, both the long range tags 18 and short range tags 20 that are outside the intended portal zone 16, e.g., in zone 48 and zone 50 in FIG. 5, are out of range and do not respond. The RFID 14 reader issues a SELECT command specifying only the long range tag model number in the tag TID (step S110). Because of this SELECT command, short range tags 20 within the intended portal zone 16 do not respond to the inventory round that follows and only the long range tags 18 within the intended portal zone 16 are read (step S112). Optionally, at this lower power setting, the SELECT command could be omitted, reading all tag models in the inventory round that follows. It is noted that that process shown in FIG. 3 can be periodically repeated by reader 14 at predetermined intervals to update the inventory within interrogation zone 16.

An alternative embodiment of the present invention uses an EAS bit. The existence of an EAS bit is currently being proposed and reviewed by the EPCglobal Hardware Action Group; however, there is no defined use for the functionality of the EAS bit. This alternative approach is particularly appropriate for combination EAS and RFID item level intelligence applications where the over range/inadequate read problem was first observed. A hard tag with very small footprint is required in this item level intelligence application. The small footprint limits the read range of the tag. Using the EAS bit, which should always be active in an EAS hard tag, the reader can determine that it is a short read range tag. Another advantage of using the EAS bit in the RFID is the capability of direct access to the EAS bit before accessing the ID of the tag, thereby allowing for a quick determination of a short range tag without having to read the model number.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for selectively reading radio frequency identification ("RFID") tags within an RFID interrogation zone, a first number of the RFID tags having a first identifier corresponding to a first operating range and a second number of the RFID tags having a second identifier different from the first identifier, the second identifier corresponding to a second operating range different from the first operating range, the method comprising:
   selecting each RFID tag having the first identifier associated with the first operating range, the first operating range being smaller than the second operating range;
   setting a transmit power to a first power setting associated with the first operating range, the first power setting having sufficient power to activate RFID tags located within the RFID interrogation zone;
   transmitting a first command at the first power setting;
   reading each selected RFID tag having the first identifier during a first inventory round, the first command inhibiting RFID tags having the second identifier from being read during the first inventory round;
   selecting each RFID tag having the second identifier associated with the second operating range;
   setting the transmit power to a second power setting associated with the second operating range, the second power setting having sufficient power to activate RFID tags located within the interrogation zone having the second operating range; and
   transmitting a second command at the second power setting, the second command inhibiting RFID tags having the first identifier from being read during a second inventory round.

2. The method of claim 1, wherein the second command is a select command indicating the second identifier corresponding to the second operating range.

3. The method of claim 1, wherein the first command is a select command indicating the first identifier corresponding to the first operating range.

4. A radio frequency identification ("RFID") reader for selectively reading RFID tags within an RFID interrogation zone, a first number of the RFID tags being programmed with a first identifier corresponding to a first operating range and a second number of the RFID tags being programmed with a second identifier different from the first identifier, the second identifier corresponding to a second operating range different from the first operating range, the RFID reader comprising:
   a processor, the processor configured to select each RFID tag having the first identifier corresponding to the first operating range, the first operating range being smaller than the second operating range; and a transceiver electrically connected to the processor, the transceiver configured to:

transmit a first command at a first power setting, the first power setting having sufficient power to activate RFID tags located within the RFID interrogation zone having the first operating range, the first command inhibits the RFID tags having the second identifier from being read during the first inventory round; and the processor is further configured to:

read each selected tag having the first identifier during a first inventory round; and select each RFID tag having a second identifier associated with the second operating range; and the transceiver is further configured to transmit a second command at a second power setting different from the first power setting, the second power setting having sufficient power to activate RFID tags located within the RFID interrogation and not enough power to activate RFID tags located outside the RFID interrogation zone, the second command inhibits RFID tags having the first identifier from being read during a second inventory round.

5. The RFID reader of claim 4, wherein the identifier is a tag model number.

6. The RFID reader of claim 4, wherein the identifier is at least one electronic article surveillance ("EAS") bit.

7. The RFID reader of claim 4, wherein the processor is further configured to read each selected RFID tag having the second identifier during the second inventory round.

8. A radio frequency identification ("RFID") system comprising:

a plurality of RFID tags, a number of the RFID tags having a first identifier corresponding to a first operating range and a number of the RFID tags having a second identifier different from the first identifier, the second identifier corresponding to a second operating range, the first operating range being smaller than the second operating range, each RFID tag programmed with an identifier associated with the operating range of the RFID tag; and an RFID reader configured to:

select each RFID tag having the first identifier associated with the first operating range;

transmit a first command at a first power setting, the first power setting having sufficient power to activate RFID tags located within an interrogation zone, the first command inhibits the RFID tags having the second identifier from being read during the first inventory round;

read each selected RFID tag having the first identifier during a first inventory round;

transmit a second command at a second power setting, the second power setting having sufficient power to activate RFID tags located within the interrogation zone and not enough power to activate RFID tags located outside the interrogation zone; and read each RFID tag having the second identifier during a second inventory round, the second command inhibiting RFID tags having the first identifier from being read during the second inventory round.

9. The RFID system of claim 8, wherein the identifier is a tag model number.

10. The RFID system of claim 9, wherein each RFID tag includes an RFID chip having a memory, the identifier is programmed at a transponder ID ("TID") memory location of the RFID chip.

11. The RFID system of claim 8, wherein the identifier is at least one electronic article surveillance ("EAS") bit.

* * * * *